US005816300A

United States Patent [19]

Rogers

[11] Patent Number: 5,816,300

[45] Date of Patent: Oct. 6, 1998

[54] WOODWORKING JIG

[76] Inventor: William H. Rogers, 5649 Salem Bend Dr., Trotwood, Ohio 45426

[21] Appl. No.: 887,930

[22] Filed: Jul. 3, 1997

Related U.S. Application Data

[60] Provisional application No. 60/032,297 Dec. 3, 1996.

[51] Int. Cl.$^{6}$ .............................. B27G 13/00; B23Q 3/00

[52] U.S. Cl. ................. 144/136.95; 144/137; 144/144.1; 144/253.1; 144/286.5; 144/307; 269/231; 269/236; 269/303; 269/315; 409/130; 409/178

[58] Field of Search ................................ 144/1.1, 134.1, 144/135.2, 136.1, 137, 144.1, 142, 286.1, 286.5, 136.95, 154.5, 253.1, 307; 409/125, 130, 175–182; 269/289 R, 290, 303, 305, 315, 229, 231, 147, 236, 212

[56] References Cited

U.S. PATENT DOCUMENTS

| | | | |
|---|---|---|---|
| 1,503,606 | 8/1924 | Singleton | 269/147 |
| 3,450,001 | 6/1969 | Fortune | 409/130 |
| 4,128,118 | 12/1978 | Ede | 144/253.1 |
| 4,206,910 | 6/1980 | Biesemeyer | 269/236 |
| 4,215,731 | 8/1980 | Maynard | 144/136.95 |
| 4,456,043 | 6/1984 | Stocks | 144/136.95 |
| 4,787,614 | 11/1988 | Givens | 269/303 |
| 5,203,389 | 4/1993 | Goodwin | 144/134.1 |
| 5,538,231 | 7/1996 | Baldwin et al. | 269/305 |
| 5,657,971 | 8/1997 | Williams | 269/303 |

FOREIGN PATENT DOCUMENTS

| | | |
|---|---|---|
| 1 402 895 | 5/1959 | Germany . |
| 25 03 246 | 7/1976 | Germany . |

*Primary Examiner*—W. Donald Bray
*Attorney, Agent, or Firm*—Richard C. Litman

[57] ABSTRACT

A convertible woodworking jig comprising multiple components suited to making specialty woodcuts necessary for the manufacture of rails and stiles of cabinet door frames from standard milled wood stock. The jig has a base having a planar work surface, a first fence having a first straight edge, and a second fence with a second straight edge, between which edges a first cam assembly is medially positioned. The cam body is rotatably positionable for wedging a freely-positionable pressure block tight against a work piece, which is selectively positioned against one of either the first straight edge or the second straight edge. The work piece being so secured, a biscuit slot may be cut into the mitered end by use of a guide assembly disposed at an operative end of the second fence, which assembly closely guides a hand-held, power cutting tool at a predetermined angle formed relative to the plane of said second straight edge. The second fence further includes a third straight edge against which a stop assembly having a stop wall is positioned near a free end of the second fence. At the operative end of the second fence, a second cam assembly is positioned adjacent the third straight edge, which assembly can be manually operated to wedge tight a work piece positioned against the stop wall. The work piece is then ready for slotting by a hand held router.

20 Claims, 3 Drawing Sheets

WOODWORKING JIG

CROSS-REFERENCE TO RELATED APPLICATION

This application claims the benefit of U.S. Provisional Patent Application Ser. No. 60/032,297, filed Dec. 3, 1996.

BACKGROUND OF THE INVENTION

1. Field of the Invention

The present invention relates generally to woodworking jigs, more specifically, a convertible jig comprising multiple components suited to making specialty woodcuts necessary for the manufacture of rails and stiles of cabinet door frames from standard milled wood stock.

2. Description of the Related Art

Many conventional workholders have been designed for tabletop use to secure work pieces and power cutting tools. Related workholders can be generally categorized into three categories: 1) vises, namely devices with jaws that immovably grip an object but fail to provide guidance to a cutting tool; 2) guides and fences, namely devices which can usually be repositioned relative to a work surface such that one object (such as the wood stock) can be slidably and linearly moved along such guide or fence relative to a fixed object (such as the cutting tool); and 3) jigs, which typically provide both a guide and a vise to insure that precise dimensions can be uniformly and repetitively cut into immovably fixed wood stock with a guided cutting tool. Jigs often have specialized functional designs which result in multiple adjustable components that interact with one another to guide a cut of often complex angular and repetitive patterns, e.g. for a dovetail joint.

However, such jigs are then necessarily complex, have a unique design suitable for cutting only certain dimensions, or only supporting particular cutting devices intended for commercial use, thus resulting in increased manufacturing cost and being primarily directed towards use by professional, commercial woodworking operations. There is, for instance, no workholder directed towards use by the hobbyist or part-time craftsman that is simply designed and constructed for the specialized purpose of cabinet making. Moreover, of the commonly available jigs, none are compatible for use with more than one of the commonly available but different-purpose woodworking tools, such as hand-operated routers and biscuit cutters.

Therefore, a need exists for a woodworking apparatus that is essentially a convertible jig suited to making all the necessary specialty woodcuts to standard milled wood stock for the manufacture of rails and stiles of cabinet door frames. A further need is apparent for convertible features which allow the jig to be used with more than one type of commonly available hand-held power woodcutting tool. The present invention seeks to solve the aforementioned needs.

Although the related art is replete with various vises, guides and jigs, none show a combination of structural components, function or intended purpose consistent with the present invention. For example, both U.S. Pat. No. 4,206,910 issued to Biesemeyer on Jun. 10, 1980, and U.S. Pat. No. 1,503,606 issued to Singleton on Sep. 19, 1922, describe woodworking devices having cam mechanisms useful in clamping work pieces. However, unlike the present invention, Singleton describes a bench vise not intended for use with or as a cutting tool guide, and Beisemeyer describes a cam locking lever for securing a table saw fence relative to the fixed saw blade. Each patent fails to disclose a woodworking device having a plurality of cam members, wherein a first cam member secures a work piece alternatively to either a first or second fence for a first type of guided cut by a hand-held power cutting tool and a second cam member secures a second work piece to the outside of the first fence for a second type of cut to complete the series of cuts necessary for assembling cabinetry rails and stiles.

Examples of jigs including less related clamping elements vary substantially in purpose. For example, U.S. Pat. No. 3,450,001 issued to Fortune on Jun. 17, 1969 describes a work holder for holding relatively thin sheets of rigid materials, such as laminates, including a pair of raised and slotted guides, spaced apart for guiding a router therebetween and having clamps for holding the laminate thereunder. U.S. Pat. No. 4,128,118 issued to Ede on Dec. 5, 1978 describes a device intended for the do-it-yourselfer for cutting laminates. The device includes at least one fence and a bridge extending perpendicularly therefrom to overlie the work piece, with a guideway thereon for movement of a router over the work piece. U.S. Pat. No. 4,215,731 issued to Maynard on Aug. 5, 1980 also describes a router table for more general woodworking use. The table includes a fixed fence with a carriage movably mounted with respect thereto for carrying a portable router across the work piece. U.S. Pat. No. 4,456,043 issued to Stocks on Jun. 26, 1984 shows a simple clamping fence which guides a router from only one side over the work piece while holding it down onto a planar surface.

Finally, other examples of fences and vises for use with machine tables and tools can be seen in U.S. Pat. No. 4,787,614 issued to Givens on Nov. 29, 1988, and German Offenlegungschrift Nos. 1,402,895 issued on Dec. 12, 1968 and 2,503,246 issued on Jul. 29, 1976; however, none show combinations of elements similar to that seen on the present invention.

Therefore, the related art fails to address the above referenced needs nor describes a cabinet making device which (1) holds and positions wood stock to make cabinet door stiles and rails, (2) allows the user to easily make biscuit slots and panel slots using commonly available hand-operated power cutting tools, (3) uses pressure blocks and cam mechanisms which quickly and securely hold the work pieces, and (4) provides a plurality of means to guide a router or biscuit cutter to cut all necessary slots for completion of a rail or stile. The present invention provides such an apparatus.

None of the above inventions and patents, taken either singly or in combination, is seen to describe the instant invention as claimed.

SUMMARY OF THE INVENTION

The present invention is a convertible woodworking jig comprising multiple components suited to making specialty woodcuts necessary for the manufacture of rails and stiles of cabinet door frames from standard milled wood stock. The preferred embodiment is specifically designed to accept wood stock which has been mitered to have 45 degree angled ends.

The jig includes a base having a planar work surface, a first fence having a first straight edge and attached to the planar work surface, and a second fence with a second straight edge between which a first cam assembly is medially positioned. The first cam assembly has a cam body rotatably positionable for wedging a freely-positionable pressure block tight against a work piece, which is selectively positioned against one of either the first straight edge or the second straight edge. The work piece being so secured, a biscuit slot can then be cut into the mitered end of a work piece by use of a guide assembly disposed at an operative end of the second fence. The guide assembly receives and closely guides a hand-held, power cutting tool over the work surface at a predetermined angle formed relative to the plane of the second straight edge. Two embodiments of the guide assembly are described, one for receiving a router and one for receiving a biscuit-slot cutter.

The second fence further includes a third straight edge diametrically opposed from and generally parallel with the second straight edge. Against this third straight edge, a stop assembly having a stop wall is positioned proximate a free end of the second fence. At the operative end of the second fence, a second cam assembly is positioned adjacent the third straight edge. This cam assembly also has a cam body rotatably positionable for wedging tight a work piece positioned against the stop wall. The work piece is then ready for slotting by a hand held router.

Accordingly, it is a principal object of the invention to provide a woodworking jig for securely holding work stock for the manufacture of cabinetry rails and stiles.

It is another object of the invention to provide a woodworking jig for use with hand-held power cutting tools.

It is a further object of the invention to provide a woodworking jig which holds wood stock with mitered ends.

Still another object of the invention is to provide a woodworking jig with a pressure block for distributing clamping forces over a work piece.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a convertible woodworking jig comprising multiple components suited to making specialty woodcuts necessary for the manufacture of rails and stiles of cabinet door frames from standard milled wood stock. As a matter of background, the finished faces of cabinets are generally fabricated from a frame of hardwood, such as maple or oak, which has been milled to standard stock sizes. Such standard work piece or stock (indicated as W in the figures) is usually dimensioned having either 1 and ¾ inch or 2 and ¼ inch nominal widths, with a ⅝ to ¾ inch nominal thickness, each stock size available in various lengths. Having chosen an appropriately dimensioned stock for a cabinetry project, a series of finish cuts, slots, and grooves must be made to create the rails (horizontal members) and stiles (vertical members) from which a frame of either a cabinet frame or cabinet door is assembled. The rail or stile includes a 45 degree end cut, sawn across its width from each end of the woodstock resulting in an end side E, into which a biscuit-slot S must be cut for insertion of a beechwood biscuit, by means of either a router R (shown in FIG. 2) or a specialized tool known as a biscuit-slot cutter C. The 45 degree end sides are then assembled forming a frame, such as for the cabinet door. Likewise, biscuit-slots may be cut into a side T defining the thickness of woodstock for creating a butt joint of a stile of a cabinet frame. Moreover, the assembled cabinet door usually includes a floating panel, which is inserted during assembly into a groove G (often referred to as a dado) made in the side T of the work piece W defining the thickness.

Figure 1:
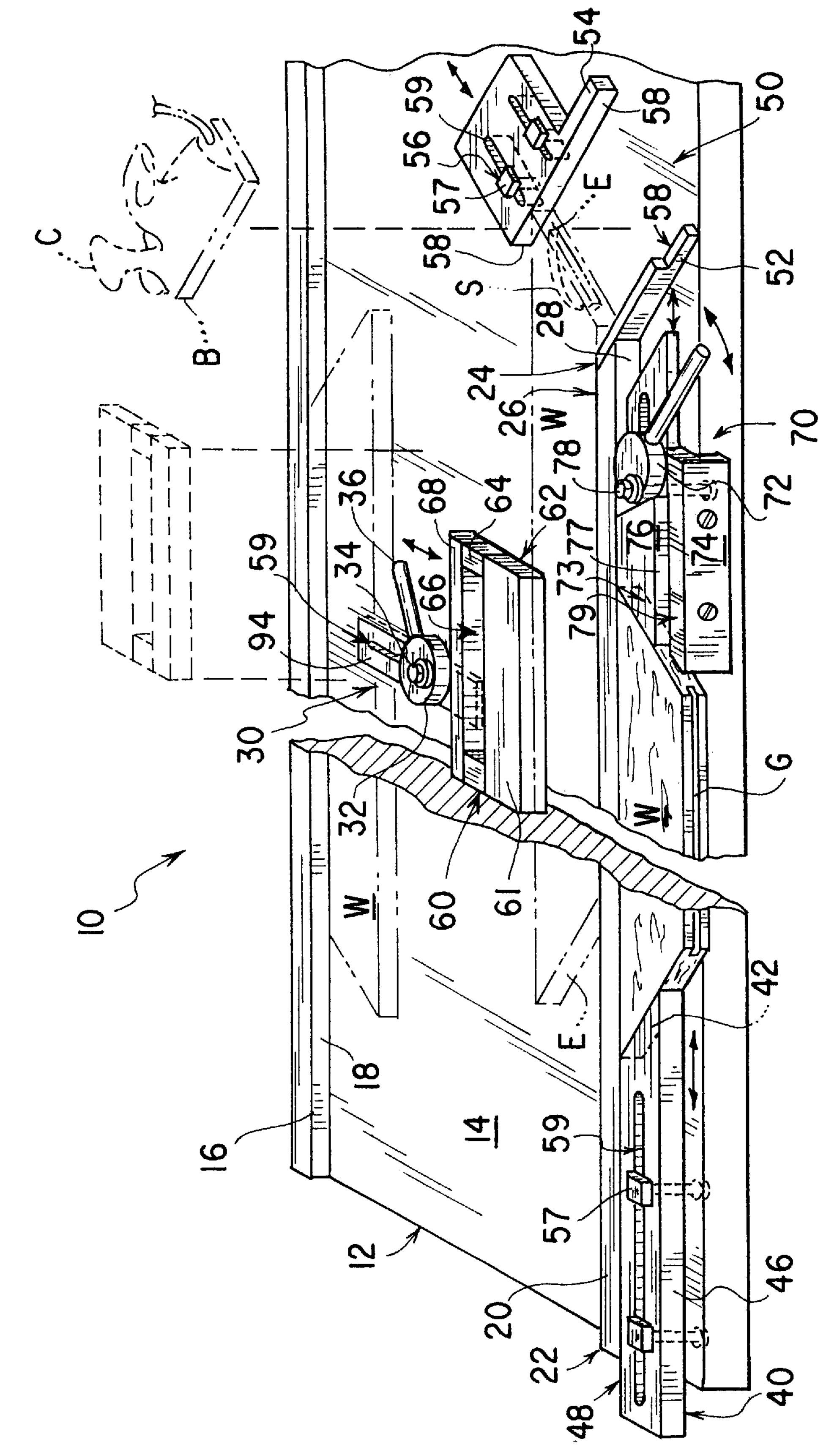
FIG. 1 is a perspective view of the preferred embodiment according to the present invention.

Turning now to FIG. 1 of the drawings, a woodworking jig 10 for preparing rails and stiles is shown having its several main components, including a base 12 with a planar work surface 14, onto which a first fence 16 and a second fence 20 are mounted. The first fence 16 has a first straight edge 18 facing the second fence 20. The second fence 20 has a free end 22 and an operative end 24 and a second straight edge 26 therebetween. The second fence 20 is attached onto the planar work surface 14 so that the second straight edge 26 is spaced parallel to and facing the first straight edge 18. These fences 16,20 are suitable for resting a work piece W on its wide side on the work surface 14 with its thick side T abutting the length of a straight edge 18,26. In the preferred embodiment, the height of the fence corresponds exactly to the height to the work piece W, to allow surface routing to be performed on the upwardly facing wide side of the work piece W.

Between the fences 16,20, a first cam assembly 30 is medially positioned, the first cam assembly 30 having a cam body 32 rotatably positionable for wedging tight a work piece W. In the preferred embodiment a pressure block 60 is used to distribute clamping forces across the work piece W for a virtually immovable viseing effect by removably lodging the pressure block 60 between the first cam assembly 30 and a work piece W. As illustrated by the phantom lines showing multiple work pieces W, one work piece W may be selectively positioned against either one of the first straight edge 18 or the second straight edge 26 and the pressure block 60 accordingly moved to be lodged between the first cam assembly 30 and the work piece W. The cam body 32 can then be manually rotated by the associated handle 36 to tightly wedge the pressure block 60 against the work piece W and, in turn, wedge the work piece W against the associated fence.

With the work piece W so secured, it may now be acted on by the wood worker to perform a series of precise slotting cuts. The jig 10 provides a guide assembly 50 disposed at the operative end 24 of the second fence 20 for receiving and closely guiding a hand-held, power cutting tool (C or R) over the work surface at a predetermined angle formed relative to the plane of the second straight edge. The angle at which the power tool is guided is determined by the angle at which the end cut of the rail or stile has been made, which in most instances, is 45 degrees. Therefore, although the guide assembly 50 may be angularly adjustable, in the preferred embodiment, the guide assembly 50 is fixed at a 45 degree angle relative to the second straight edge 26. This 45 degree angle is suitable for almost all cabinetry frame making needs. However, should a biscuit-slot be necessary in a thick side T, as opposed to the end side E, the work piece may be wedged against the first fence 16 and, while secured thereto, machined by a biscuit-slot cutter C.

More specifically, the guide assembly 50 of the preferred embodiment comprises a first guide body 52 and a second guide body 54, each attached to the work surface 14. Each guide body 52,54 defines a guide wall 58, the guide walls 58,58 being spaced apart parallel to and facing one another. This relationship allows the base B of the hand-held, biscuit-slot cutting power tool C to be guided over the work surface 14 at a precise, predetermined angle relative to the second straight edge 26, preferably 135 degrees from the operative end 24 of the second straight edge 26 which, as noted, translates for use with a 45 degree cut end side. As such, the guide wall 58 of the first guide body 52 terminates proximate the operative end 24 and fixedly intersects therewith, so that the biscuit-slot cutter C is allowed to freely extend beyond the plane of the second straight edge 26.

As can be seen from FIG. 1, the second guide body 54 is laterally adjustable and includes adjustment means for spacing and securing the guide walls 58,58 at various distances apart in parallel to one another. This allows variously sized bases of hand-held, cutting power tools of different manufacturers to be accommodated. More specifically, the adjustment means of the preferred embodiment comprise a modification to the second guide body 54 by including a pair of slots 59,59 which are oriented normal to the guide walls 58,58 at close tolerances. Through each slot, a bolt 57 passes, each bolt 57 being threaded and removably seated in the base 12. The bolt 57 may be fixed directly into the base 12 by any means known to an individual of ordinary skill in the art which allows each bolt 57 to be tightened and bind the second guide body 54 securely to the base 12 at a position selected after sliding of the second guide body 54 over the work surface 14. The close tolerances and perpendicular relationship of the slots 59,59 to the guide walls 58,58 insures that the guide wall 58 will slide inwardly or outwardly and maintain the precise angular direction of the guide wall.

Figure 2:
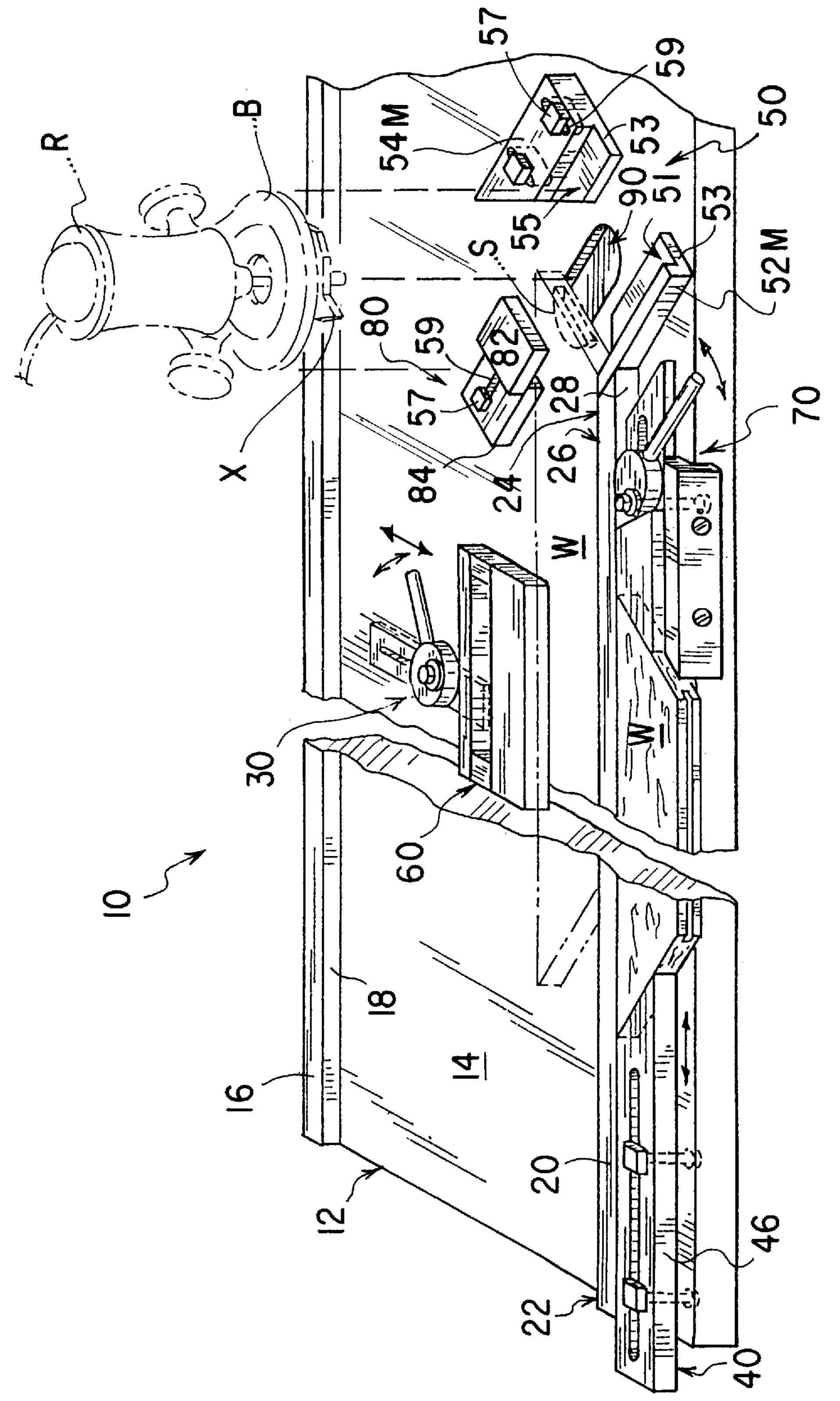
FIG. 2 is a perspective view showing a second embodiment according to the present invention.

In FIG. 2, a guide assembly 50 is shown modified for use with a router outfitted with a biscuit-slotting bit X. The bit X extends below the router R and therefore must be elevated above the work surface 14 to properly cut a biscuit slot S in an end side E. Therefore, a modified first guide body 52M is provided which not only includes a guide wall 58 but also includes a step 53 depending perpendicularly therefrom. The step 53 therefore defines a first glide surface 51, which is parallel with the work surface 14, on which the base B of the router R will glide. Likewise, a modified second guide body 54M is similarly equipped, having both a guide wall 58 and a step 53 depending perpendicularly therefrom, thereby defining a second glide surface 55. The second glide surface 55 is not only parallel with the work surface 14, but also coplanar with the first glide surface 51, thereby insuring that the router base B will ride evenly and parallel with the work surface 14. The modified second guide body 54M may also include adjustment means comprising slots 59 and bolts 57 as previously described above for the second guide body 54. Moreover, a depression 90 may be defined in the worksurface 14 to accept the tip of the bit X.

Whereas the biscuit-slot cutter C automatically limits the depth of a slot cut, the rotating bit B of router R is prone to cut continuously as an individual laterally moves through the guide assembly 50. Therefore, a depth stop 80 is provided in the second embodiment of the jig 10 for preventing passage of the hand-held router beyond a predetermined point along the guide walls 58. An exemplary depth stop is shown attached to the work surface 14 between the first fence 16 and second fence 20 and distal from the guide assembly 50. The depth stop 80 includes a lower member 84 and top member 82 offset and extending from the lower member, thereby creating a space between the top member 82 and the work surface 14. The space created should allow the work piece W to fit closely beneath the top member 82, thereby allowing the router base B to come into contact with the top member 82 just as the bit X fully gouges out the biscuit slot S. To accomplish this objective, the lower member 84 includes adjustment means, including a slot 59 and bolt 57 operating on the same principles as described above for the second guide body 54.

As previously noted, a rail and stile may be slotted for receiving a panel of the cabinet door. Decorative finish cuts thereon may also be desired. Using a conventional manner of making such cuts, a router equipped with an appropriate collared bit would ride on the wide side facing up of a work piece W, thus carving out a thick side T. Both type cuts can be created with the work piece W locked down or secured on the worksurface in front of second fence 20, i.e. the surface proximate a third straight edge 28 of second fence 20. As shown in FIG. 1 and FIG. 2, the second fence 20 includes a third straight edge 28 diametrically opposed from and generally parallel with the second straight edge 26, against which a work piece W rests with one of its thick sides T. Because the work piece W has two 45 degree cut end sides, and the groove G must be formed on the remaining thick side T, the piece must be secured using a wedging operation. Thus, a stop assembly 40 is provided for abutting one 45 degree cut end side E, and second cam assembly 70 is provided for tightening against the other 45 degree cut end side E. The stop assembly 40 is also reciprocally adjustable by a reciprocal positioning means to accommodate work pieces of various lengths.

The stop assembly 40 comprises a stop block 46 having a straight wall 48 slidably abutting the third straight edge 28. The stop block 46 also defines a stop wall 42 which is angular to the straight wall 48 and serves as the wall against which a 45 degree cut end side E abuts. Thus, the stop wall 42 in the preferred embodiment is angled 45 degrees relative to the third straight edge 28 forming a perfect angle into which the end side E fits. However, other acute angles may be chosen for the stop wall 42 relative to the third straight edge 28. Moreover, the stop block 46 also defines a longitudinal slot 59, which is oriented parallel to the third straight edge 28, through which two bolts 57,57 are passed. Each bolt 57 is threaded and removably seats in the base 12 so that the bolt 57 may be tightened to bind the stop block 46 securely the base 12 at a selected position along the second fence 20. This allows changes to made in the relative distance of the stop wall 42 from the second cam assembly 70, which remains relatively fixed in position at the operative end 24 of the second fence 20. Thus, longitudinal adjustment and securement of the stop block 46 allows work pieces of variable length to be tightly wedged against the stop block 46.

The second cam assembly 70 is not only positioned proximate the operative end, but also adjacent the third straight edge 28 in order to achieve the wedging effect against a mitered work piece W. The cam assembly 70 is shown in detail in FIG. 3, and generally in FIGS. 1 and 2, having a plurality of parts including a rail 74, a wedging block 76, a second cam body 72, and a pivot member 78.

The rail 74 is fixedly attached to the work surface 14, defining a wall 79 which is spaced apart and parallel to the third straight edge 28. The space so formed allows the wedging block 76, which defines a pair of straight walls 77, to rest therein with one of each of the pair of walls 77 slidably abutting the third straight edge 28 and the rail 74.

The wedging block 76 also has an angular wall 73 which faces the stop assembly 40 and forms an acute angle relative to the third straight edge 28. The angle so formed corresponds with the angle cut of the end side E desired to be wedged.

Figure 3:
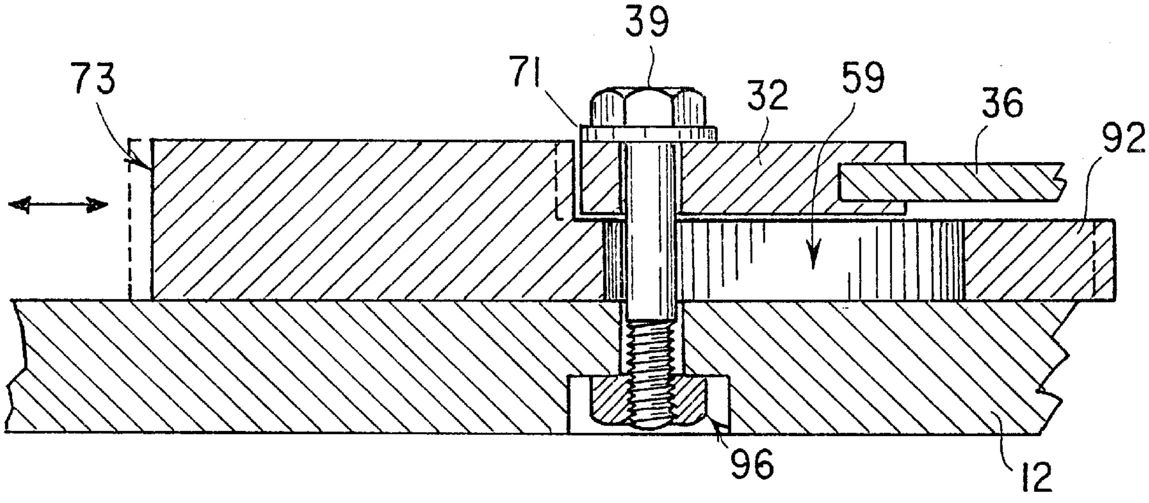
FIG. 3 is a cross sectional view showing the second cam assembly according to the present invention.

In order to wedge the block 76 and best appreciated from FIG. 3, a cam wall 71 is provided against which the second cam body 72 makes contact at some point during its rotation. To do this, the second cam body 72 defines an eccentric bore 38 oriented normal to the work surface 14, through which a pivot member 39 passes. The pivot member 39 is threadably and removably seated in the base 14 in any manner known to an individual with ordinary skill in the art; however, the seating point must be positioned so as to allow the second cam body 72 to be rotated and wedge against the cam wall 71. To permit manual rotation, a handle 36 extends from the cam body 32 in a radial manner.

To maintain the wedging block 76 in close association with the second cam body 72, the wedging block 76 defines a flange 92 which extends from the cam wall 71 and further defines a longitudinal slot 59. The slot 59 is oriented parallel with the rail 74 and the third straight edge 28 so that the wedging block 76 can slide by pivot member 39. This movement allows the second cam body 72 when rotated to force the wedging block 76 towards the stop assembly 40, as suggested by the phantom lines in FIG. 3, thereby causing a wedging effect.

Focusing now on the operational features of the first cam assembly 30, the principles of operation are essentially similar to that of the second cam assembly 70. The first cam assembly 30 includes a circular cam body 32 with an eccentric bore oriented normal to the work surface 14 and a pivot member 34 passing through the bore. However, in order to accommodate different widths of work pieces W, the first cam assembly 30 includes positioning means for selectively spacing and rotatably securing the cam body 32 at various distances between the first straight edge 18 and the second straight edge 26. In the preferred embodiment, the base 12 is therefore modified to define a slot 59 oriented normal to both the first fence 16 and the second fence 20 in which the pivot member 34 rides. To prevent wear, the slot 59 may be formed in a metal plate 94 recessed into the work surface 14 and flush therewith. To secure the cam assembly 30 in place, a securing means for securing the pivot member 34 to the base 12 and rotatably within the bore of the cam body 32 is necessary. Any suitable means known to an individual skilled in the art may be used and, as suggested by FIG. 3, may simply be a mating threaded shaft and nut assembly 96.

In use, the first cam assembly 30 also employs a pressure block 60 for removably lodging between the first cam assembly 30 and a work piece W whereby forces through a pressure point caused by the cam body 32 against the pressure block are transmitted through it, thereby distributing a holding force over a larger area of a work piece engaged by the pressure block than made possible by the cam assembly 30 alone. This allows a nearly immovable arrangement of the work piece W until the cam assembly is released.

Figure 4:
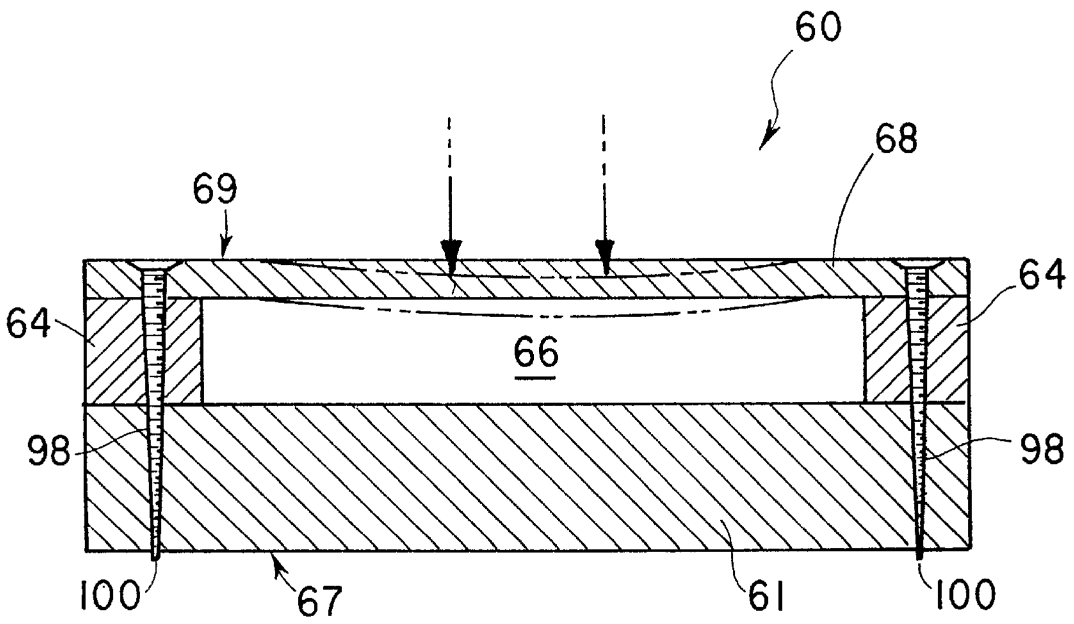
FIG. 4 is a cross sectional view of the pressure block according to the present invention.

As seen in FIG. 4, the pressure block 60 comprises a rigid body 61 having a planar surface 62 for resting on the work surface 14. The body also defines a straight edge 67 for abutting a work piece, which straight edge 67 depends perpendicularly from the planar surface 62. A rigid bridge member 68 is spaced apart from the rigid body 61 by a pair of legs 64,64, which collectively define a central cavity 66 therebetween. The bridge member 68 includes a side 69 which is diametrically opposed from the straight edge 67.

The bridge member 68 has critical material characteristics which allow resistive flexing under pressure from the cam assembly 30, as shown in greatly exaggerated detail in FIG. 4 by the curved phantom lines caused by forces applied in the direction of the arrows directed at the bridge member 68. The flexing allows the rigid cam body 32 to become tightly wedged and prevents slipping of the cam. The bridge member 68 transfer the forces through the legs 64,64 and distributes the forces through and across the rigid body 61. Suitable materials which are both highly rigid yet flex suitably for use as the bridge member 68 may be selected from the group consisting of maple wood and brass. The overall dimensions of the pressure block 60 using the maple wood which have been found to be suitable are 2 inches (width)×2 inches (thickness)×6 inches (length), wherein the maple bridge consists of a bar of wood approximately ¾ inch in width. A sheet of heavy gauge brass may be used in lieu of a bar of maple wood and obtain the same rigidity and flexing characteristics.

As a final feature of the pressure block 60, the bridge member 68 may be fastened to the rigid body 61 using a bugle head screw 98, the head of which is countersunk into the bridge member. The screws 98 attach the bridge member 68 to each of the legs 64 and rigid body 61, each screw 98 passing through both the leg 64 and the rigid body 61 to penetrate the straight edge 67. With a screw of slightly longer than 6 inches in the wooden embodiment of the pressure block 60, the tip of the screw 98 thereby forms a tap point 100 for engaging a work piece and preventing lateral movement thereof. Thus, the pressure block 60 can be laid onto the work surface 14 between the cam assembly 30 and the work piece W, wedging the work piece virtually immovably in place when the cam body 32 is rotated into contact with the bridge member 68.

It is to be understood that the present invention is not limited to the sole embodiment described above, but encompasses any and all embodiments within the scope of the following claims.

I claim:

1. A woodworking jig comprising:

a base having a planar work surface;

a first fence attached to said planar work surface, said first fence having a first straight edge;

a second fence attached to said planar work surface, said second fence having a free end, an operative end and a second straight edge therebetween, said second straight edge being spaced parallel to and facing said first straight edge;

a first cam assembly attached to said planar work surface intermediate said first fence and said second fence, said first cam assembly having a cam body rotatably positionable for wedging tight a work piece selectively positioned against one of said first straight edge and said second straight edge; and, a guide assembly attached to said planar work surface and disposed at said operative end of said second fence for receiving and closely guiding a hand-held, power cutting tool over said work surface at a predetermined angle formed relative to said second straight edge.

2. The woodworking jig according to claim 1, further comprising a pressure block for removably lodging between said first cam assembly and a work piece.

3. The woodworking jig according to claim 2, wherein said pressure block comprises a rigid body having a planar surface for resting on said work surface, a straight edge depending perpendicularly from said planar surface for abutting a work piece, a side diametrically opposed from said straight edge having a pair of legs defining a cavity therebetween, and rigid bridge member attached to said legs and spanning said cavity, said bridge member having material characteristics of resistively flexing under pressure from said cam assembly, whereby forces through a pressure point caused by said cam assembly upon said bridge member are transmitted through said legs and distributed across said straight edge thereby distributing a holding force over a larger area of a work piece engaged by said pressure block than possible by said cam assembly alone.

4. The woodworking jig according to claim 3, wherein said bridge member is a material selected from the group consisting of maple wood and brass.

5. The woodworking jig according to claim 3, further comprising a screw attaching said bridge member to each of said legs, said screw passing through said rigid body and penetrating said straight edge thereby forming a tap point for engaging a work piece.

6. The woodworking jig according to claim 1, wherein said guide assembly comprises a first guide body and a second guide body attached to said work surface, each said guide body having a guide wall, said guide wall of said first guide body terminating proximate said operative end and intersecting therewith, said guide walls of said second guide body facing said guide wall of said first guide body and being in spaced parallel relation thereto for receiving the hand-held, cutting power tool and guiding the power tool over said work surface at said predetermined angle relative to said second straight edge.

7. The woodworking jig according to claim 6, wherein said second guide assembly further includes adjustment means for spacing and securing said guide walls at various distances apart in parallel to one another whereby variously sized bases of a hand-held, cutting power tool may be accommodated.

8. The woodworking jig according to claim 7, wherein said adjustment means comprise:

said second guide body defining a plurality of slots oriented normal to said guide walls; and a plurality of bolts, each said bolt threadably and removably seated in said base and passing through a different one of said slots, whereby said bolts may be tightened to bind said second guide body securely to said base at a selected position along said slots.

9. The woodworking jig according to claim 1, wherein said guide assembly comprises:

a first guide body having a guide wall and a step depending perpendicularly therefrom defining a first glide surface parallel with said work surface; and a second guide body having a guide wall and a step depending perpendicularly therefrom defining a second glide surface parallel with said work surface and coplanar with said first glide surface;

wherein each said guide body is attached to said work surface, said guide wall of said first guide body terminates proximate said operative end and intersects therewith, said guide wall of said second guide body facing said guide wall of said first guide body and being in spaced parallel relation thereto;

whereby both said guide walls and said steps cooperate to receive the hand-held router and guide it over said work surface at said predetermined angle relative to said second straight edge such that a bit of the router remains raised over said work surface.

10. The woodworking jig according to claim 9, further comprising a depth stop for preventing passage of the hand-held router beyond a predetermined point along said guide walls.

11. The woodworking jig according to claim 1, wherein said predetermined angle is 45 degrees relative to said second straight edge.

12. The woodworking jig according to claim 1, wherein said first cam assembly includes positioning means for adjustably securing said cam body at various distances intermediate said first straight edge and said second straight edge.

13. The woodworking jig according to claim 12, wherein said positioning means comprises:

said base defining a slot oriented normal to both said first fence and said second fence;

a cam body defining an eccentric bore oriented normal to said work surface;

a pivot member passing through said eccentric bore and said slot of said base; and securing means for securing said pivot member to said base and rotatably within said bore.

14. The woodworking jig according to claim 1, wherein said second fence includes a third straight edge diametrically opposed from and generally parallel with said second straight edge, said woodworking jig further comprising:

a stop assembly attached to said planar work surface proximate said free end and adjacent said third straight edge, said stop assembly having a stop wall; and a second cam assembly attached to said planar work surface proximate said operative end and adjacent said third straight edge, said second cam assembly having a cam body rotatably positionable for wedging tight a work piece positioned against said stop wall.

15. The woodworking jig according to claim 14, wherein said stop wall is acutely angled relative to said third straight edge.

16. The woodworking jig according to claim 14, wherein said stop wall is angled 45 degrees relative to said third straight edge.

17. The woodworking jig according to claim 14, wherein said stop assembly includes a reciprocal positioning means for repositioning and securing said stop wall along said third straight edge.

18. The woodworking jig according to claim 17, wherein said reciprocal positioning means comprises a stop block having a straight wall slidably abutting said third straight edge, said straight wall adjacent to said stop wall, said stop block defining a slot oriented parallel to said third straight edge; and a plurality of bolts, each said bolt threadably and removably seated in said base and passing through said slot of said stop block, whereby said bolts may be tightened to bind said stop block securely to said base at a selected position along said second fence, thereby changing the relative distance of said stop wall from said second cam assembly.

19. The woodworking jig according to claim 16, wherein said second cam assembly comprises a rail attached to said work surface spaced apart and parallel to said third straight edge;

a wedging block defining a pair of straight walls slidably abutting each of said third straight edge and said rail, an angular wall facing said stop assembly and forming an acute angle relative to said third straight edge, and a cam wall;

a second cam body defining an eccentric bore oriented normal to said work surface;

a pivot member passing through said eccentric bore, threadably and removably seated in said base, and positioned so as to allow said second cam body to be rotated and wedge against said cam wall.

20. A pressure block for use with a cam assembly comprising:

a rigid body having a planar surface for resting on a planar work surface, a straight edge depending perpendicularly from said planar surface for abutting a work piece, a side diametrically opposed from said straight edge having a pair of legs defining a cavity therebetween, and rigid bridge member attached to said legs and spanning said cavity, said bridge member having material characteristics of resistively flexing under pressure from said cam assembly and comprising a material selected from the group consisting of maple wood and brass, whereby forces through a pressure point caused by said cam assembly upon said bridge member are transmitted through said legs and distributed across said straight edge thereby distributing a holding force over a larger area of a work piece engaged by said pressure block than possible by said cam assembly alone.

* * * * *